United States Patent [19]

VanSteenkiste et al.

[11] Patent Number: 5,142,644
[45] Date of Patent: Aug. 25, 1992

[54] ELECTRICAL CONTACTS FOR POLYMER DISPERSED LIQUID CRYSTAL FILMS

[75] Inventors: Thomas H. VanSteenkiste, Washington; Nuno A. Vaz, West Bloomfield, both of Mich.

[73] Assignee: General Motors Corporation, Detroit, Mich.

[21] Appl. No.: 666,310

[22] Filed: Mar. 8, 1991

[51] Int. Cl.$^5$ .................. G02F 1/1343; G02F 1/13
[52] U.S. Cl. .................................. 359/88; 359/51
[58] Field of Search ............... 350/336, 331 R; 359/88

[56] References Cited

U.S. PATENT DOCUMENTS

| | | | |
|---|---|---|---|
| 4,516,836 | 5/1985 | Ferrato | 350/336 |
| 4,586,789 | 5/1986 | Kishimoto et al. | 350/336 |
| 4,688,900 | 8/1987 | Doane et al. | 350/347 X |
| 5,032,006 | 7/1991 | Grupp et al. | 350/336 |

FOREIGN PATENT DOCUMENTS 0050513  3/1985  Japan ................... 350/336

OTHER PUBLICATIONS

Catalogue Illustration from Instruments Specialties Company, Inc., Delaware Water Cap, PA.

Primary Examiner—Stanley D. Miller
Assistant Examiner—Anita Pellman Gross
Attorney, Agent, or Firm—George A. Grove; Domenica N. S. Hartman

[57] ABSTRACT

An electrical contact for use with an optically responsive, polymer dispersed liquid crystal film is provided. The preferred electrical contact means consists of a pair of U-shaped, electrically conductive spring connectors. Each of these spring connectors is rigidly biased against corresponding transparent electrodes provided on each of the surrounding transparent substrates, so as to provide a compressive clamping force against the electrode. This ensures an intimate and complete electrical connection between each spring connector and each transparent electrode. The spring connector may be formed from any electrically conductive material which is sufficiently strong yet yielding and which is sufficiently anodic with respect to the electrode material, a preferred material being a suitable beryllium copper alloy when the electrodes are formed from a material such as indium-tin oxide. The preferred spring connector also provides redundant electrical contact between each electrode and itself, therefore, enabling its use in large area devices, such as window panels, wherein it is imperative that failure at a single point of electrical contact does not result in failure of the electrical connection.

16 Claims, 2 Drawing Sheets

ELECTRICAL CONTACTS FOR POLYMER DISPERSED LIQUID CRYSTAL FILMS

The present invention generally relates to optically responsive polymer dispersed liquid crystal thin films. More specifically, this invention relates to a means for electrically and redundantly contacting such a polymer dispersed liquid crystal film, which allows for the efficient control of the opacity of the optically responsive, polymer dispersed liquid crystal film.

BACKGROUND OF THE INVENTION

Polymer dispersed liquid crystal (PDLC) films, consisting of liquid crystal microdroplets dispersed in a polymer matrix, are potentially useful for solar energy control and other electro-optic applications, such as sunroofs, solar windows and information displays. Generally, these materials are formed by the incorporation of liquid crystals in a thermoplastic binder, or in a polymer matrix which has been cured using thermal, ultraviolet or electron-beam methods. The polymer dispersed liquid crystal films are typically sandwiched between a pair of transparent substrates. An electrically conductive transparent electrode is provided on each substrate, so that each of the transparent electrodes contacts the polymer matrix having the liquid crystals dispersed therein. Alternatively for applications where total reflectance is desired, these films may also be provided between one transparent and one reflective substrate, wherein each substrate has a corresponding transparent or reflective electrode. These polymer dispersed liquid crystal films can easily and reversibly be switched from an off-state which is cloudy, opaque, and light scattering, to an on-state which is essentially transparent. Most often this switching is accomplished by application of a suitable electrical voltage across the thickness of the film. However other methods for accomplishing this change in the transparency of the film include the application of heat or stress, or alternatively the application of a magnetic field across the thickness of that portion of the film where transparency is desired.

If the change in the transparency of the film is controlled by application of an appropriate electrical voltage and thereby an electrical potential is generated across the thickness of the film, it is necessary to make electrical contact to the polymer dispersed liquid crystal film. This is a particularly important, yet problematic, feature of these films and the devices incorporating these films.

Typically, the electrical contacts are connected to the transparent electrodes provided on each transparent substrate. However these transparent electrodes are extremely thin layers of either an appropriate electrically conductive oxide or metal; generally only about a few hundred Angstroms thick. They are therefore fragile both mechanically and chemically. Inadvertent mechanical abrasion and/or chemical etching during assembly of the contacts to the electrodes, may easily damage the films causing loss of electrical continuity between the contacts and the electrodes. Alternatively, inadvertent chemical oxidation during normal processing may result in increased electrical resistivity. Further, these fragile films may be easily damaged by the passage through them of large electrical currents, such as the electrical currents required in large area devices like window panels or when a high frequency electrical signal (i.e., above about several hundred Hertz) is used to enhance the electro-optic response. Therefore, it is desirable to provide a means for making the electrical contacts to the electrodes, which avoids these shortcomings.

Many techniques have been employed to make the necessary electrical contacts to the transparent electrodes, including self-sticking electrically conductive tapes such as formed from a metal; conductive adhesives such as adhesives loaded with electrically conductive particles; self-sticking unidirectional conductive composites; and conductive foams such as carbon-filled polyurethane and styrofoam. However, none of these techniques provide the desired level of reliability in use. These contact means fail fairly easily under any applied mechanical stress. They also tend to fail easily when large electrical currents are passed through them. Therefore they are not suitable for the activation of large devices having these polymer dispersed liquid crystal films since the current drawn by these films increases with the increased size of the film.

In addition, another frequent and significant problem which occurs during use of these conventional contact means is electrical arcing between components. Electrical arcing can be extremely detrimental since it often results in damage to the transparent electrode and consequent failure of the electrical contact. The conditions which promote electrical arcing between components are generally due to poor techniques for connecting the electrical contacts to the transparent electrodes. These assembly techniques frequently cause electrical shorts to develop, particularly when the contact means employed requires large pressures to establish electrical contact with the transparent conducting electrode. This is a requirement for many of these conventional self-sticking electrically conductive materials. Even when properly applied, it is difficult to apply the electrical contact uniformly along its entire length, which is adjacent with the electrode. As a result, frequent arcing occurs and eventually destroys the electrical contacts.

A further disadvantage associated with the use of these conventional electrical contact means is that, upon repeated bending of the polymer dispersed liquid crystal films, these types of aforementioned electrical contacts usually fail. Since one of the potential advantages of these types of polymer dispersed liquid crystal devices is their flexibility, it is preferred that the electrical contacts have a similar degree of flexibility.

Therefore, the preferred electrical contact means, which is employed to make connection to the transparent electrodes in these devices having these polymer dispersed liquid crystal films, should preferentially satisfy several attributes. First, the materials used to make the electrical contact should be chemically compatible with the electrode material, so as to alleviate the corrosion or oxidation of the thin layer of transparent electrode. Secondly, the assembly of the contact means should result in a consistently uniform and intimate bond between the contact means and the electrode, so as to eliminate any electrical shorts or arcing which may occur particularly when large currents are passed through the contacts such as in large area devices or when a high frequency signal is applied. Also, it is desirable that the contact means provide redundancy in the electrical connection so as to ensure that even multiple failures at the contact pad will not result in a complete loss of electrical contact.

In addition, the contact means should be able to tolerate large amplitude bending motions in order to survive subsequent processing and use of the polymer dispersed liquid crystal films, particularly when flexed or employed in tightly bent applications. The contact means should also have good overall durability and environmental stability, so as to enable widespread use of the devices containing these films. Also, the contact means should be capable of passing large currents without failure or electrical arcing. Lastly, other features which would also be desirable are design simplicity, ease and speed of fabrication, as well as low cost.

Accordingly, what is needed is a means for electrically contacting a polymer dispersed liquid crystal film which provides these desired features and which thereby alleviates the shortcomings associated with the use of conventional contact means.

SUMMARY OF THE INVENTION

Therefore, it is an object of the present invention to provide an electrical contact for electrical connection with a polymer dispersed liquid crystal film, wherein the film can be made largely opaque in one mode of operation and essentially transparent in another mode of operation.

It is a further object of the present invention that such an electrical contact means be readily assembleable and adaptable to various designs and shapes in which the film of polymer dispersed liquid crystal material may be employed.

It is still a further object of this invention that such an electrical contact means provide redundant electrical connection to the polymer dispersed liquid crystal film by providing a plurality of electrical contacts at each contact pad.

In accordance with a preferred embodiment of this invention, these and other objects and advantages are accomplished as follows.

An electrical contact means for use with an optically responsive, polymer dispersed liquid crystal film is provided. The electrical contact means is readily assembleable and provides a consistently uniform and intimate electrical connection. Further, the electrical contact means is adaptable to virtually any design and shape in which the film of polymer dispersed liquid crystal material may be employed. Still further, the preferred electrical contact means provides reliable and redundant electrical connection to the polymer dispersed liquid crystal film by providing a plurality of electrical contacts at each contact pad. These features are particularly useful when large currents are employed such as in a large area device like a window panel, or when high frequency signals are employed to enhance the electro-optic properties of the film.

The polymer dispersed liquid crystal film used in conjunction with this electrical contact means is characterized by having a polymer matrix with liquid crystal microdroplets dispersed therein. The liquid crystals utilized may be any of the conventional birefringent nematic, birefringent chiral nematic or smectic liquid crystal materials available. The liquid crystal microdroplets display positive or negative dielectric anisotropy and/or positive or negative diamagnetic anisotropy, thereby being capable of undergoing repeated transitions, either electrically, thermally, or magnetically induced, between opaque and transparent states.

The polymer dispersed liquid crystal film is sandwiched between a pair of transparent substrates. Each transparent substrate has an electrically conductive transparent electrode provided thereon so that each of the electrodes contacts the polymer matrix. The opacity of the film is changed by the application of an electrical potential across the thickness of the film. In accordance with this invention, an electrically conductive spring connector contacts each of the transparent electrodes, thereby transmitting the externally generated signal through to each of the electrodes.

The preferred electrical contact means consists of a U-shaped, electrically conductive spring connector which is rigidly biased against the transparent electrode so as to provide a compressive clamping force against the electrode. This ensures an intimate and complete electrical connection between each spring connector and each transparent electrode. The spring connector may be formed from any electrically conductive material which is sufficiently yielding, a preferred material being a suitable beryllium copper alloy.

An inventive feature of this invention is that redundant electrical contact at each electrode is provided. Each of the preferred spring connectors making up the electrical contact means of this invention, has a plurality of identical projections at each contact pad and is biased against each electrode. Therefore, with this arrangement, failure at a single point of electrical contact does not result in failure of the electrical connection.

In addition to the redundancy of the electrical connection, the preferred electrical contact means which is employed to make connection to the transparent electrodes in these devices containing these polymer dispersed liquid crystal films, also has several other advantages. The preferred material used to make the electrical contact, a beryllium copper alloy, is chemically compatible with the electrode material so as to minimize the possibility of corrosion or oxidation of the thin transparent electrode. The electrode material is typically chosen from a selection of known materials such as indium-tin oxide, tin oxide, fluoride-tin oxide and a number of gold, silver or bronze based transparent thin layers.

Further, the contact means uniformly and intimately contacts the electrode by providing a compressive clamping force around the electrode, which results in the substantial elimination of electrode arcing during use. Also, the preferred contact means is extremely yielding, thereby being capable of tolerating large amplitude bending and flexing motions for use with the polymer dispersed liquid crystal films. Lastly, the preferred contact means is characterized by good strength and durability, thereby enabling widespread use of the devices having these films.

We are the first to provide such an electrical contact means for these polymer dispersed liquid crystal films which is characterized by these particularly advantageous features. Other objects and advantages of this invention will be better appreciated from a detailed description thereof, which follows.

BRIEF DESCRIPTION OF THE DRAWINGS

The above and other advantages of this invention will become more apparent from the following description taken in conjunction with the accompanying drawings wherein like references refer to like parts and wherein.

DETAILED DESCRIPTION OF THE INVENTION

An electrical contact means for use with an optically responsive, polymer dispersed liquid crystal film is provided. The electrical contact means is readily assembleable and provides a consistently uniform and intimate electrical connection between components by providing a compressive clamping force around the components. Further, the electrical contact means is adaptable to virtually any design and shape in which the film of polymer dispersed liquid crystal material may be employed. Still further, the electrical contact means provides reliable and redundant electrical connection to the polymer dispersed liquid crystal film by providing a plurality of electrical contacts at each contact pad.

Figure 1:
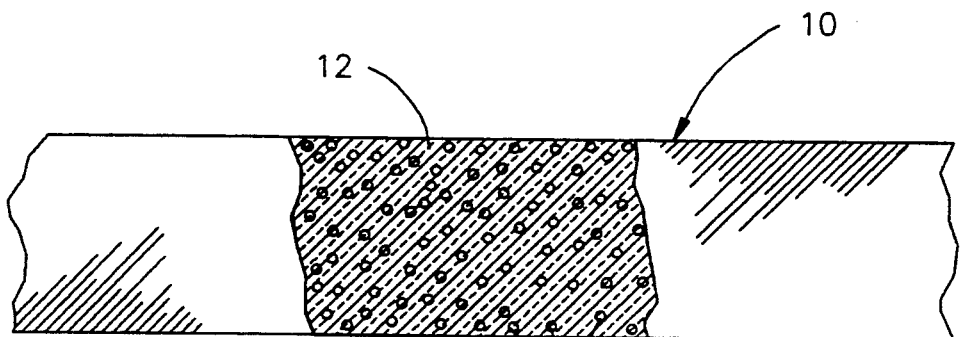
FIG. 1 is a schematic view in cross-section and greatly enlarged of a polymer dispersed liquid crystal film having a polymer matrix and microdroplets of liquid crystal dispersed therein.

An illustrative example of the polymer dispersed liquid crystal film 10, used in conjunction with this electrical contact means, is schematically shown in FIG. 1. The film 10 consists of either a thermoplastic or cured thermoset polymer matrix 12 having microdroplets 14 of an appropriate liquid crystal material dispersed therein. The film 10 does not constitute an inventive feature of this invention. The polymer matrix 12 may be any of the polymer materials used in these types of films, including for example thermoplastic or thermal, ultraviolet, or electron-beam curable thermoset polymer materials. The liquid crystals utilized may be any of the conventional birefringent nematic, birefringent chiral nematic or smectic liquid crystal materials available. The liquid crystal microdroplets 14 display positive or negative dielectric anisotropy and/or positive or negative diamagnetic anisotropy, thereby being capable of undergoing repeated transitions, either electrically, thermally, or magnetically induced, between opaque and transparent states. For purposes of this invention, the opacity of the film 10 will be electrically induced by the application of an appropriate electrical potential across the thickness of the film 10.

Figure 2:
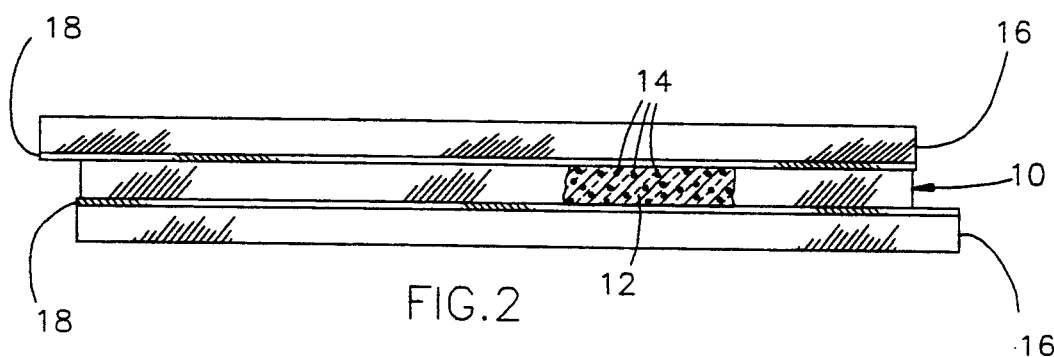
FIG. 2 is a schematic view in enlarged cross-section of the film shown in FIG. 1 disposed between two transparent substrates.

FIG. 2 illustrates the formed polymer dispersed liquid crystal film 10 of FIG. 1 sandwiched between two transparent substrates 16, which are most probably glass but other suitably transparent and durable materials may also be used such as polyester or polycarbonate. Each transparent substrate 16 has an electrically conductive, transparent electrode 18 provided thereon, such that each of the electrodes 18 contacts the cured, polymer dispersed liquid crystal film 10. The electrically conductive, transparent electrodes 18 are formed from a coating of any of the following known materials commonly used for this purpose, including indium-tin oxide, tin oxide, fluoride-tin oxide and a number of gold, silver or bronze based transparent thin layers. The thickness of the transparent electrodes 18 is typically only a few hundred Angstroms thick and is shown greatly exaggerated, as well as their relation to the transparent substrate, to better show the features of this invention. The electrodes 18 are provided between the formed film 10 and each transparent substrate 16, so as to physically and electrically contact the cured film 10 and electrically communicate across the thickness of the film 10.

Figure 3:
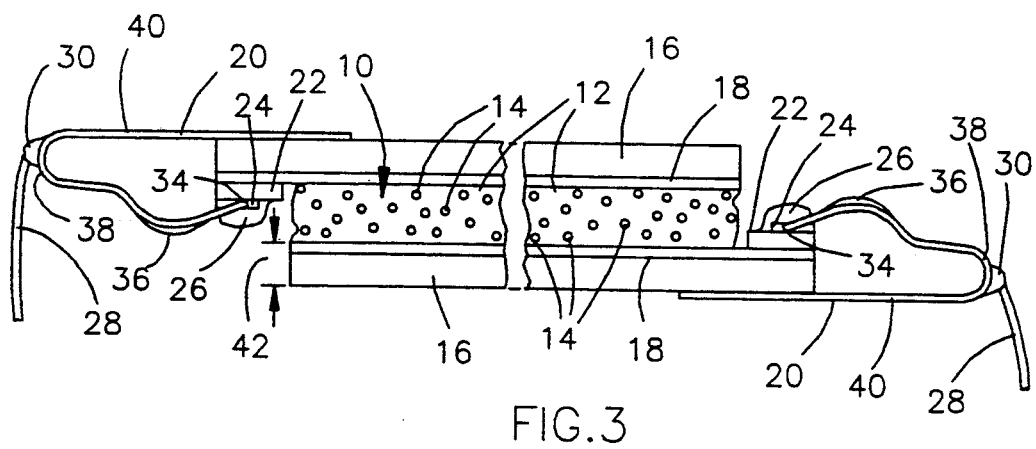
FIG. 3 is a cross-sectional view of the preferred spring connectors making up the electrical contact means in accordance with this invention, as they are electrically connected to the polymer dispersed liquid crystal film.

Shown in FIG. 3 is an illustrative example of the mode in which a typical polymer dispersed liquid crystal film 10 would be employed with the spring connectors 20 of this invention. The preferred electrical contact means 20 are electrically connected to each of the transparent electrodes 18 provided on the transparent substrates 16, between which the polymer dispersed liquid crystal film 10 is provided.

As stated previously, the film 10 contains a formed polymer matrix 12 having microdroplets 14 of liquid crystal dispersed therein. Each of the preferred electrical contact means 20 is also connected to an external signal wire 28 which is electrically connected to external electronic equipment (not shown) used for generating the appropriate signal across the thickness of the film 10. A contact pad 22 of an appropriate electrically conductive material, such as silver, gold, or nickel as well as others, is preferably provided on the transparent electrode 18 at the preferred contact region 22, so as to ensure a high quality electrical and mechanical connection between the components.

Figure 4:
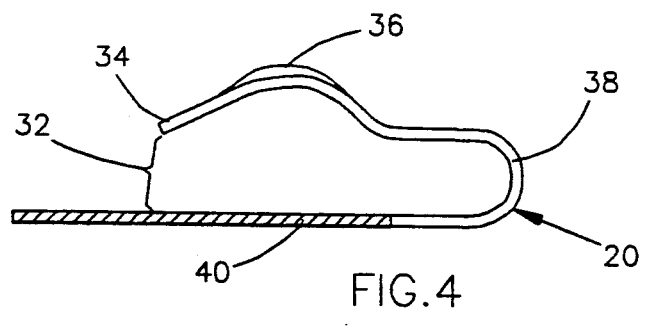
FIG. 4 is a cross-sectional view of an individual spring connector in accordance with a preferred embodiment of this invention.

In particular, the preferred electrical contact means 20 consists of a generally U-shaped, electrically conductive spring connector 20, as shown in FIG. 4. The spring connector 20 may be formed from any electrically conductive material which has sufficient strength and yieldablity, and which is sufficiently anodic with respect to the material used for forming the electrode 18. It is important that the electrode 18 be cathodic with respect to the spring connector 20, so as to avoid oxidation and decomposition of the fragile electrode 18. It is preferred that any oxidation due to the mismatch in materials occur at the more substantial spring connector 20. Therefore, the material used for forming the spring connector 20 should be anodic with respect to the material used for forming the electrode 18, however not strongly anodic which would cause premature failure of the spring connector 20. A preferred material is the beryllium copper alloys which are characterized by, not only, good spring properties but also low chemical reactivity with the chosen electrode 18 materials. Other suitable spring connector 20 materials in view of the preferred electrode materials described above, include nickel and even tin, cadmium and zinc. One material which is definitely not suitable for use in the spring connector 20 is gold, since gold is extremely chemically stable and therefore would result in the oxidation and decomposition of the fragile electrode 18.

The spring connector 20 has a contact end 34 which contacts and electrically connects to the contact pad 22 provided on the transparent substrate 16, although it is not necessary that a contact pad 22 be provided. If the contact pad 22 is not provided, the contact end 34 of the spring connector 20 contacts directly to the transparent electrode 18. It is preferred, although not necessary, that the contact pad 22 be utilized so as to ensure a good mechanical and electrical connection between the components since the contact pad 22 provides an additional amount of electrically conductive material, as well as for additional protection of the fragile electrodes 18 during use. However, suitable results are obtained when the spring connector 20 contacts only the electrode 18, due to the spring nature of the connector 20 which compressively clamps and thereby securely retains the electrode 18 when biased against the substrate 16.

The transparent substrates 16 having the intermediately disposed electrodes 18 and film 10 are inserted within the gap 32 between the contact end 34 and the flat back portion 40 of the spring connectors 20, so that the contact end 34 appropriately contacts the particular component. The U-shaped end 38 of the spring connector 20 is contiguous with both the contact end 34 and the flat back portion 40, and permits radially outward movement by both the contact end 34 and back portion 40.

The height of the gap 32, shown in FIG. 4, between the contact end 34 and the flat back portion 40 of the spring connector 20, as measured when the spring connector is relaxed, is decisively smaller than the total thickness (42 in FIG. 3) of each transparent substrate 16 and corresponding electrode 18 and contact pad 22. This is to ensure that when the device is inserted within the spring connector 20, and accordingly the spring connector 20 yields radially outward in an open manner, that the contact end 34 of the spring connector 20 is (and remains) rigidly biased against either the transparent electrode 18 (or the contact pad 22 if desired) provided on the transparent substrate 16. The components are securely retained and clamped together by the compressive spring force of the spring connector 20. This ensures an intimate and complete electrical connection between each spring connector 20 and the contact pad 22 provided on each transparent electrode 16.

It is preferred that the height of the gap 32 in the spring connector 20 be about two-thirds to three-fourths the height of the thickness 42 of the inserted components. However, the ratio of these heights will depend upon various factors including the materials used, the thicknesses of the various components and spring connector 20, and the desired contact rigidity. Certainly, in order to achieve the rigidly biased action by the contact end 34 of the spring connector 20 against the contact pad 22 provided on the transparent substrate 16, it is desirable to employ a spring connector gap 32 which is less than about 90% of the height 42 of the substrate 16 components. If the gap 32 of the spring connector 20 is greater than about 90% of the total height 42 of the substrate 16 components, an insufficient clamping force will result and the components will require further efforts to ensure that they are rigidly retained by the spring connector 20. In practice, it is believed that the height of the gap 32 should not be less than about 50% of the total height 42 of the substrate 16 components either, since that may result in too much strain within the spring connector 20 and accordingly cause premature failure of the connector 20.

The spring connector 20 also preferably contains an arcuate region 36 intermediate between the contact end 34 and the U-shaped region 38, as shown in FIGS. 3 and 4. The arcuate region 36 ensures a single point of contact at the contact end 34 to the contact pad 22 or other desired region. This is preferred, since without the presence of the arcuate region 36 adjacent and contiguous to the contact end 34, the spring connector 20 would electrically and physically contact the entire portion of substrate 16 and electrode 18 material inserted within its contact end 34. This could cause electrical shorting during use. For this reason, it is preferred that the spring connector 20 have an arcuate region 36 adjacent to the contact end 34.

Figure 5:
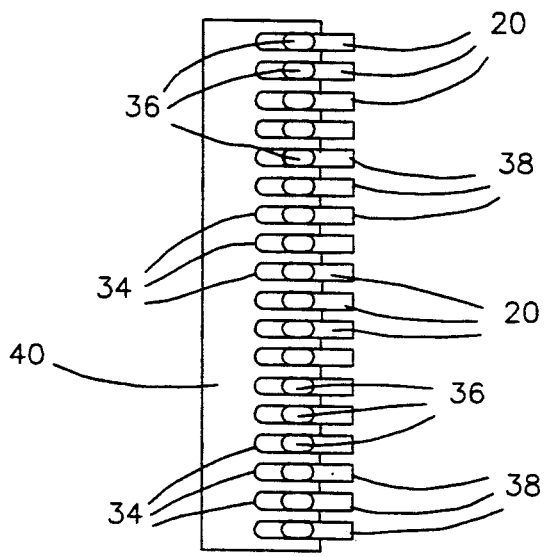
FIG. 5 is a top view of the preferred spring connector showing a multitude of identical projections for redundant electrical connection at a contact pad.

An advantageous feature of the contact means 20 of this invention is that redundant electrical contact can be made with each transparent electrode 18. As shown in FIG. 5, a plurality of these spring connectors 20 can be provided for contact with a single, large contact pad which would be provided on the transparent substrate. The plurality of spring connectors 20 would all share a single, common flat back region 40. However, there would be the plurality of identical spring connectors 20 each having a contact end 34 and an arcuate region 36 adjacent to the contact end 34. The transparent substrate would then be inserted within the gap between the plurality of contact ends 34 and the common flat back region 40, similarly as if there was only a single spring connector 20 used to make the electrical connection. However, with this redundant electrical connection design, failure at a single point of electrical contact does not result in complete failure of the electrical connection.

Figure 6:
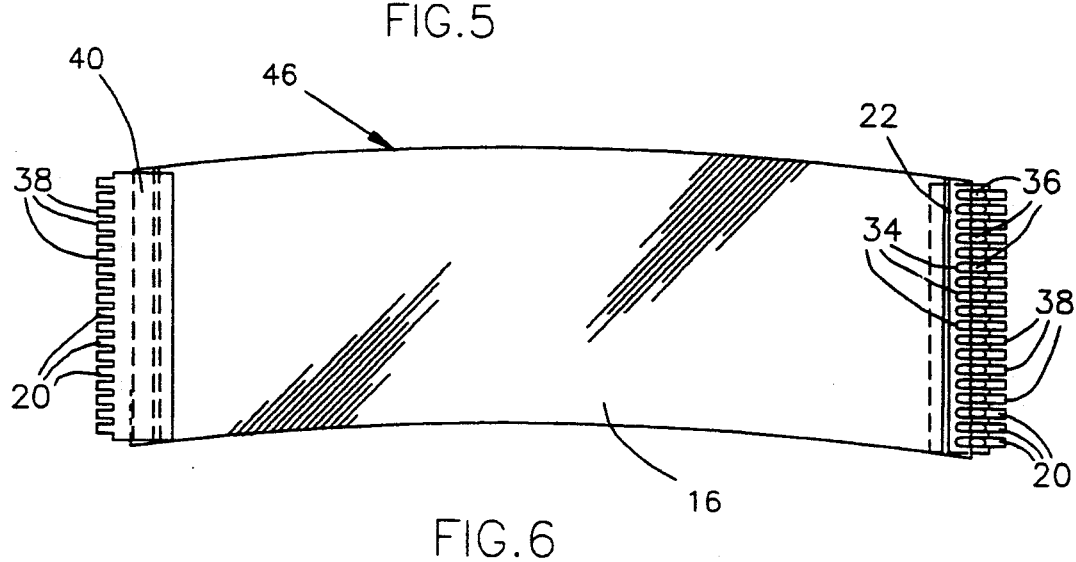
FIG. 6 shows a window panel formed of the polymer dispersed liquid crystal film shown in FIGS. 1 and 2, and two electrical contact means in accordance with the preferred embodiment of this invention.

Shown in FIG. 6 is an illustrative example of a large window panel 46 suitable for use in an automobile window or sunroof, as well as other applications, which illustrates the usefulness of the redundant electrical connection means of FIG. 5. The window panel 46 is formed from a suitable polymer dispersed liquid crystal film sandwiched between two electrically conductive, transparent electrodes which are provided on corresponding transparent substrates. (Only one of the transparent substrates 16 can be seen from this view; FIG. 3 shows an exemplary side view of this window panel.)

The preferred redundant electrical connection means of this invention is employed at both sides of the window panel 46. The connection means contains a plurality of identical U-shaped spring connectors 20, each having an individual contact end 34 and all sharing the common flat back region 40. The window panel has a large contact pad 22, wherein each of the contact ends 34 are physically and electrically connected thereto, upon insertion of the window panel within each electrical connection means 20.

The backside of the substrate 16 is inserted within the redundant spring connection means 20 on the left-hand side of the FIG. 6, such that the redundant spring connectors 20 are biased against the electrode, and the flat back region 40 of the redundant spring connectors 20 is contiguous with the backside of the substrate 16. The redundant spring connectors 20 rigidly hold the window panel by the compressive clamping force which they exert on the electrodes. The corresponding contact ends (not shown on the left-hand side) contact the transparent electrode (18 not shown) on the underside of transparent substrate 16. The transparent substrate (16) which is not visible in this view (but which is visible in the side view of FIG. 3) is electrically and physically contacted by the compressive clamping force exerted by the redundant contact means 20 biased against the electrode provided on the right-hand side of the window panel 46.

In a specific example, with reference again to FIG. 3, a polymer dispersed liquid crystal film 10 containing the liquid crystal microdroplets 14 embedded within a suitable polymer matrix 12 was prepared, by curing between two transparent glass substrates 16 having predeposited electrically conductive, transparent indium-tin oxide electrodes 18, using standard techniques. Several films were formed in this manner incorporating various commercially available liquid crystal mixtures including birefringent nematic ROTN404 available from F. Hoffman-LaRoche, Nutley, N.J. and birefringent nematic BL009 available from BDH Limited, Poole, England. A suitable polymer precursor which was employed, includes approximately 37.5 volume percent Photomer 6008 which is available from Diamond Shamrock, Morristown, N.J., approximately 50 volume percent PETMP and approximately 12.5 volume percent PETA, which are both available from Evans Chemetics, W. R. Grace and Co., Darrien, Conn. However, any other of the known liquid crystal and polymer matrices materials could be satisfactorily substituted, since the teachings of this invention are directed to the electrical connections employed and not the specific film composition.

In this specific, preferred example, a contact pad 22 was formed on each transparent electrode 18 by coating the electrode 18 with a thin layer of silver paint (alternatively another electrically conductive paint could be used) in that region where electrical connection is desired. The contact pad 22 formed from the silver paint protects the fragile transparent electrode 18 from inadvertent abrasion during assembly and use, and also facilitates a more intimate electrical and mechanical connection between the spring connector 20 and the transparent electrode 18.

The spring connector 20 employed in the specific example has been described above and when unstrained had a gap height 32 which was about 75% smaller than the thickness 42 of the combined substrate 16 and electrode 18 layers. Again, this ratio of the gap opening 32 of the unstrained spring connector 20 to the thickness 42 of the combined substrate 16 and electrode 18 layers is important to ensure sufficient compressive and clamping forces by the spring connector 20 on the conductive electrode layer 18 or contact pad 22 on the substrate 16.

After the spring connector 20 was positioned over the contact pad 22 as desired and allowed to compressively clamp the contact pad 22 and electrode 18, a second coating 24 of electrically conductive silver paint (or alternatively other electrically conductive paint) was applied to the points 24 of contact between the spring connector 20 and contact pad 22, so as to enhance the electrical contacts and further protect the area from environmental degradation during use.

Finally, a region 26 of a suitable adhesive, such as Norland Optical Adhesive NOA65 from Norland Products Inc., New Brunswick, N.J., was applied over the contact regions 26 and cured appropriately. Other suitable adhesive materials such as epoxides, polyurethanes, or silicones as well as others could also be employed with no foreseeable detrimental results. In addition, it is possible that the adhesive could be applied over the entire contact pad 22 as well as over a portion or all of the electrode 18, again with no foreseeable detrimental results. The NOA65 adhesive was cured by exposing to ultra-violet radiation for a few seconds. The use of this adhesive layer 26 is preferred, but not necessary, since it permanently seals the contact region 26 from exposure to environmental factors, such as moisture, oxidation and dust, which may accelerate the degradation of the electrical connections.

The adhesive also serves to enhance the mechanical sturdiness and reliability of the contact region 26 and to prevent the spring connector 20 from slipping over the electrode 18, which accordingly prevents abrasion of the electrode 18. It is to be noted that the use of this spring connector 20 securely clamps and contacts the substrate 16 and electrode 18. However, there is still a possibility that the spring connector 20 could work loose during assembly and use, particularly if the height of its gap 32 in relation to the thickness 42 of the substrate 16 components is large, and could inadvertently cause damage to the electrode 18. In the extreme case, if the spring connector 20 worked completely loose, total failure of the electrical connection would result. Therefore, it is preferred that the use of an appropriate adhesive at the contact region 26 be employed.

Lastly, electrical signal wires 28 were attached to the spring connectors 20 by a standard soldering method. Certainly other attachment methods could be used such as by press fitting the electrical wire 28 into the spring connector 20, or by using metal clamps, alligators, switches or any other conventional means. The electrical signal wires 28 are connected to external electrical equipment which generate the desired electrical signals for control of the opacity of the film 10.

Various tests of the durability of these spring connectors 20 and their electrical connections with these polymer dispersed liquid crystal films revealed a significant improvement over conventional electrical connection means. The spring connectors 20 of this invention showed improved durability, and provided rugged electrical contacts which exhibited prolonged continuity even after severe mechanical flexing of the contact, as well as extended lifetimes and the absence of electrical arcing, including when large currents were passed through the electrical contacts such as in large area devices like automotive window panels and when high frequency electrical signals were employed.

In another example, after assembling the spring connector 20 around the substrate 16 and electrode 18, the spring connector 20 was crimped to closely conform its shape to the shape of the substrate 16. This resulted in a substantially flattened and more compact spring connector with no observable changes in its performance.

In still another example, the second coating 24 of silver paint and top layer 26 of adhesive were omitted and a coating of electrically conductive adhesive (conducting adhesive PTX-510 from Polytronix Inc., Richardson, Tex.) was substituted therefor. This embodiment also produced an electrical connection means having the improved result described above. Also, with this embodiment, the electrically conductive adhesive rigidly secures the compressive clamping force of the spring connector 20 on the electrode 18 while electrically connecting the spring connector 20 to the various components. Therefore, the use of the first silver contact pad 22 may not be required.

The spring connector of this invention provides many advantages with its unique shape which rigidly secures the electrical connection with an electrode by providing a compressive clamping force when biased against the electrode, as well as providing redundancy in the electrical connection. In addition, the preferred material used to make the electrical contact, a beryllium copper alloy, is chemically compatible with the common electrode materials, including preferably indium-tin oxide as well as tin oxide, fluoride-tin oxide or a number of gold, silver or bronze based transparent thin layers. Therefore, the possibility of corrosion or oxidation of the various materials is significantly reduced. Also, the spring connector uniformly and intimately contacts the electrode, which results in the substantial elimination of electrode arcing during use while maximizing the integrity of the electrical connection. Further, the preferred spring connector is characterized by durability and strength yet good yieldability, thereby being capable of tolerating large amplitude bending and flexing motions for widespread use of these types of devices containing the polymer dispersed liquid crystal films.

While the invention has been described in terms of a preferred embodiment, it is apparent that other forms could be adopted by one skilled in the art, such as by the replacement or modification of the various materials with other electrically conductive and/or adhesive materials, or by the modification of the shape of the spring connector such that it is not substantially U-shaped but yet it still provides a compressive clamping force when biased against the electrically conductive electrode and substrate, or by using a spring connector having a number of projections ranging from only a single projection to a multitude of projections. In addition, it is apparent that the teachings of this invention could be readily incorporated into a device having an appropriate film provided between one transparent substrate and electrode, as well as one reflective substrate and electrode, such as when total reflectance is desired. Further, the films employed with the connection means of this invention are not limited to the polymer dispersed liquid crystal type of films which were discussed, but may also include films such as the NCAP type which are Nematic Curvilinear Aligned Phase films characterized by encapsulated liquid crystal within a polymer matrix, and PN-LCD films which are useful as reverse mode, Polymer Network Liquid Crystal Displays. Lastly, it should be clear that the connection means of this invention which has been described for use with polymer dispersed liquid crystal devices, could be equally suitable for making electrical connections on other devices incorporating fragile conducting surfaces such as, for example, electrically defrosting windshields and electrochromic devices, as well as others. Accordingly, the scope of the invention is to be limited only by the following claims.

The embodiments of the invention in which an exclusive property or privilege is claimed are defined as follows:

1. An optically responsive polymer dispersed liquid crystal film comprising:
    a pair of substrates, each having an electrode disposed thereon with a polymer matrix therebetween so that each of said electrodes contacts said polymer matrix, at least one of said substrates and its corresponding electrode being transparent, said polymer matrix having liquid crystal microdroplets dispersed therein; and
    means for electrically contacting at least one of said electrically conductive transparent electrodes, said means being at least one electrically conductive, essentially U-shaped spring connector having a contact end and a U-shaped region with an arcuate region disposed contiguous with and between said contact end and said U-shaped region, said contact end of said spring connector being biased against a corresponding contact region of said electrode, so as to compressively clamp and electrically contact said electrode at said contact region.

2. An optically responsive polymer dispersed liquid crystal film as recited in claim 1 further comprising a first electrically conductive overlayer applied to said transparent electrode at said contact region, so as to contact said electrically conductive spring connector.

3. An optically responsive polymer dispersed liquid crystal film as recited in claim 2 wherein said electrically conductive overlayer is a silver paint.

4. An optically responsive polymer dispersed liquid crystal film as recited in claim 2 further comprising:
    a second electrically conductive layer covering said spring connector at said contact region and a layer of adhesive covering said second electrically conductive layer.

5. An optically responsive polymer dispersed liquid crystal film as claimed in claim 4, wherein said second electrically conductive layer is a silver paint.

6. An optically responsive polymer dispersed liquid crystal film as recited in claim 1, wherein said spring connector has a plurality of said contact ends so as to provide redundant electrical contact at said contact region of said electrode.

7. An optically responsive polymer dispersed liquid crystal film as recited in claim 1, wherein said spring connector is formed from a beryllium copper alloy and said electrodes are formed from indium-tin oxide.

8. An optically responsive polymer dispersed liquid crystal film comprising:
    a pair of transparent substrates with a polymer matrix therebetween, said polymer matrix having liquid crystal microdroplets dispersed therein, each of said transparent substrates having an electrically conductive transparent electrode disposed thereon so that each of said electrodes contacts said polymer matrix;
    a first electrically conductive overlayer applied to a contact region on each of said transparent electrodes; and
    electrically conductive means for electrically contacting said transparent electrodes, said electrically conductive means being a pair of U-shaped, electrically conductive spring connectors each having a contact end and U-shaped region with an arcuate region disposed contiguous with and between said contact end and said U-shaped region, said contact end of each of said spring connectors being biased against said corresponding contact region of each of said electrodes so as to compressively clamp and electrically contact said electrically conductive overlayer at said contact region.

9. An optically responsive polymer dispersed liquid crystal film as recited in claim 8, wherein said first electrically conductive overlayer is a silver paint.

10. An optically responsive polymer dispersed liquid crystal film as recited in claim 8, wherein each of said spring connectors has a plurality of contact ends so as to provide redundant electrical contact at said contact region of each of said electrodes.

11. An optically responsive polymer dispersed liquid crystal film as recited in claim 8, wherein said spring connectors are formed from a beryllium copper alloy and said electrodes are formed from indium-tin oxide.

12. An optically responsive polymer dispersed liquid crystal film as recited in claim 8, further comprising:
    a second electrically conductive layer covering said spring connector at said contact region, and a layer of adhesive covering said second electrically conductive layer.

13. An optically responsive polymer dispersed liquid crystal film as claimed in claim 12, wherein said second electrically conductive layer is a silver paint.

14. An optically responsive polymer dispersed liquid crystal film comprising:
   a pair of transparent substrates with a polymer matrix therebetween, said polymer matrix having liquid crystal microdroplets dispersed therein, each of said transparent substrates having electrically conductive, transparent, indium-tin oxide electrodes disposed thereon so that each of said electrodes contacts said polymer matrix;
   an electrically conductive, silver overlayer applied to a contact region on each of said transparent electrodes; and
   a pair of U-shaped, electrically conductive spring connectors for electrically contacting said corresponding transparent electrodes, said U-shaped electrically conductive spring connectors being formed from a beryllium copper alloy and each of said U-shaped spring connectors having a plurality of projections extending from a corresponding U-shaped region, each of said projections having a contact end and an arcuate region which is contiguous with and between said contact end and said corresponding U-shaped region, each of said contact ends of each spring connector being biased against said corresponding contact region of said corresponding electrode so as to compressively clamp and redundantly electrically contact said electrically conductive overlayer at said contact region.

15. An optically responsive film as recited in claim 14 further comprising:
   a second electrically conductive, silver layer covering each of said spring connectors at said contact regions, and a layer of adhesive covering said second electrically conductive layer.

16. An optically responsive film having a polymer matrix with liquid crystal microdroplets dispersed therein and a pair of transparent substrates surrounding the polymer matrix, each substrate having an electrically conductive, transparent indium-tin oxide electrode disposed thereon so that each of the electrodes contacts the polymer matrix; wherein the improvement comprises:
   a pair of U-shaped, electrically conductive spring connectors formed of a beryllium copper alloy, each of said spring connectors having a plurality of projections, each of said projections having a contact end and an arcuate region which is contiguous with and between said U-shaped region and said contact end, wherein each of said contact ends of each of said spring connectors is biased against a corresponding contact region on each of said electrodes so as to compressively clamp and redundantly electrically contact each of said electrodes at said contact ends.

* * * * *